United States Patent [19]

Dejean

[11] Patent Number: 4,757,159
[45] Date of Patent: Jul. 12, 1988

[54] HIGH-VOLTAGE ELECTRIC CABLE TERMINATION

[75] Inventor: Pierre Dejean, Senlis, France

[73] Assignee: Filergie, France

[21] Appl. No.: 94,939

[22] Filed: Sep. 9, 1987

[30] Foreign Application Priority Data

Sep. 15, 1986 [FR] France ................. 86 12860

[51] Int. Cl.$^4$ ......................................... H02G 15/064
[52] U.S. Cl. ................................................. 174/73 R
[58] Field of Search .................. 174/73 R, 73 SC, 80, 174/142

[56] References Cited

FOREIGN PATENT DOCUMENTS 2845868  4/1980  Fed. Rep. of Germany .... 174/73 R
3300901  7/1984  Fed. Rep. of Germany .... 174/73 R
2518837  6/1983  France ............................ 174/73 R Primary Examiner—Laramie E. Askin
Attorney, Agent, or Firm—McCormick, Paulding & Huber

[57] ABSTRACT

A high-voltage electric cable termination comprises a cable having a conductive central core terminating ia a bared end, a semiconductive substance covering the core, an insulative envelope, and an equipotential screen and a protective outer sheath that are terminated at a distance from the end of the cable to bare a predetermined length of the insulative envelope. At least one layer of high permittivity material extends over at least part of the length of the bared insulative envelope. An outer protective tube of insulative material extends over substantially all of the length of the termination. A set of stiffener rods of an insulative composite material inside the tube extend parallel to the axis of the termination. A filler material intimately fills the spaces between the rods and between the high permittivity material layer and the tube.

11 Claims, 1 Drawing Sheet

HIGH-VOLTAGE ELECTRIC CABLE TERMINATION

BACKGROUND OF THE INVENTION

1. Field of the Invention

The present invention is generally concerned with high-voltage electric cables and is more particularly concerned with a new dry high-voltage cable termination.

2. Description of the Prior Art

There is already known in the prior art, notably from French patent No. 2 518 837, a high-voltage cable termination essentially comprising a conductive core (conventionally covered with a seminconductive layer), an insulative envelope covering the core, an equipotential screen placed around the envelope and a protective outer sheath. In order to optimize the distribution of the electric field between the screen and the core there are provided a number of layers of high permittivity material and, externally of these, a thin layer of semiconductive material with a non-linear coefficient of conduction, forming a linear voltage distributor, disposed over at least part of the length of the bared insulative envelope of the cable.

This type of termination is conventionally surrounded by a porcelain insulative support and an oil bath is provided inside the porcelain to prevent the presence of air that may ionize in the parts of the termination where the electric field is high.

These supports made from porcelain, a material well known for its fragile nature and absence of flexibility, require extreme care when they are fitted in the field and are therefore disadvantageous from this point of view. They are also heavy, bulky and costly.

Also, the presence of oil which is usually necessary when high voltages are involved (typically 150 kV and higher) is disadvantageous in that leaks are always possible and in that its high coefficient of expansion produces high mechanical stresses in the termination.

Moreover, if dielectric breakdown occurs, the oil may ignite and cause a fire.

An object of the present invention is to alleviate these disadvantages and to propose a new high-voltage cable termination comprising no porcelain and no oil and offering great flexibility of use in the field.

Another object of the invention is to confer a self-supporting nature on a high-voltage cable termination. Thus, over and above the electrical connection function, it may serve as a mechanical support for a hollow cylindrical distribution bar made of light alloy as conventionally associated with an isolator or a circuit-breaker.

SUMMARY OF THE INVENTION

The present invention consists in a high-voltage electric cable termination comprising a cable having conductive central core terminating in a bared end, a semiconductive substance covering said core, an insulative envelope, and an equipotential screen and a protective outer sheath that are terminated at a distance from the end of the cable to bare a predetermined length of said insulative envelope, at least one layer of high permittivity material extending over at least part of the length of said bared insulative envelope, an outer protective tube of insulative material extending over substantially all of the length of the termination, a set of stiffener rods of an insulative composite material inside said tube and extending parallel to the axis of the termination and a filler material intimately filling the space between said rods and between said at least one high permittivity material layer and said tube.

The stiffener rods are preferably made from glassfiber-reinforced epoxy resin.

Other features and advantages of the present invention will emerge from the following detailed description of a preferred embodiment thereof given by way of example only and with reference to the appended drawings.

DESCRIPTION OF THE PREFERRED EMBODIMENT

Figures 1, 2:
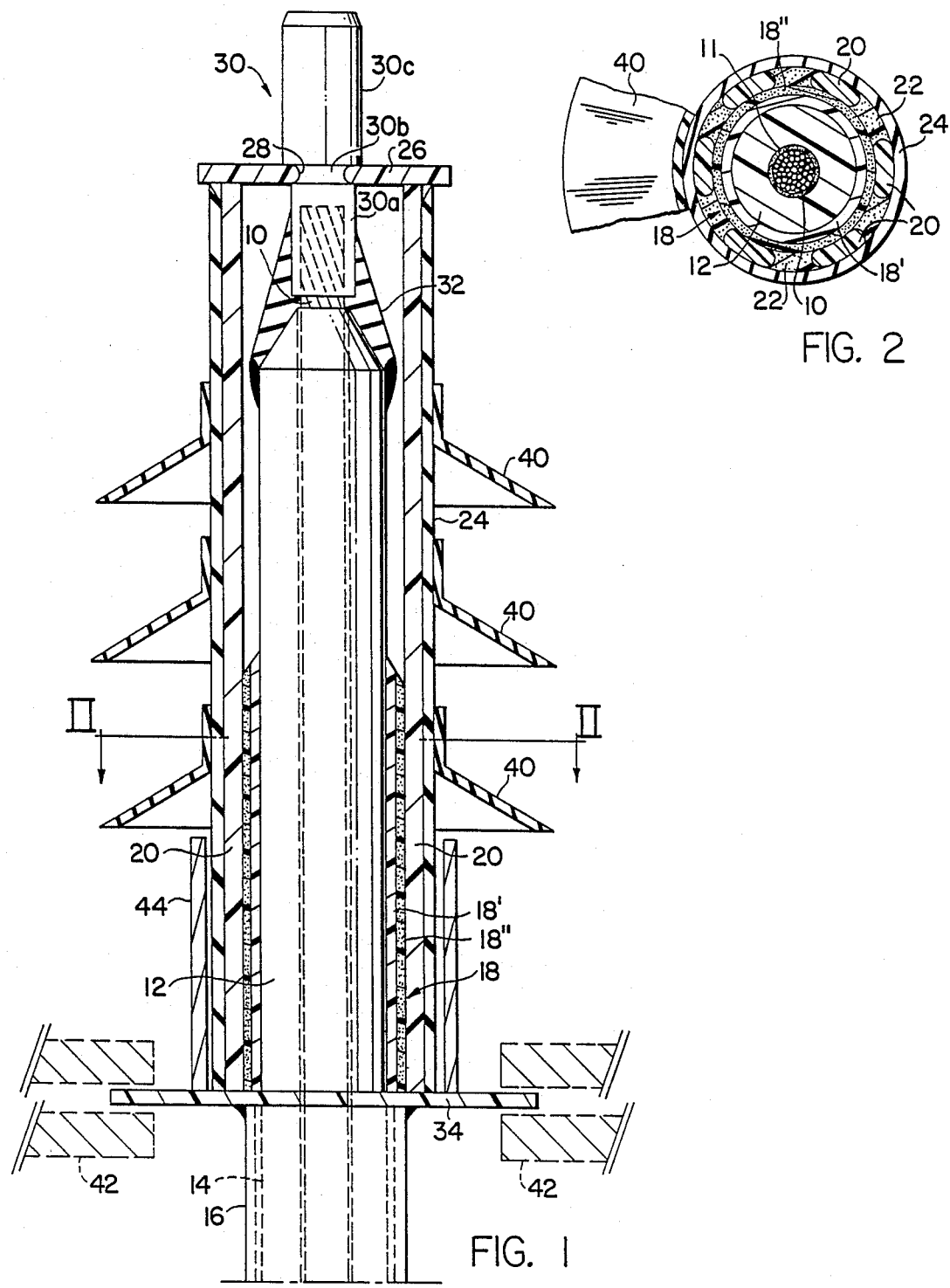
FIG. 1 is a view in partial axial cross-section of a high-voltage electric cable termination in accordance with the invention.
FIG. 2 is a view of the termination in transverse cross-section on the line II—II in FIG. 1.

Referring to the drawing, there is shown in FIGS. 1 and 2 a cable termination in accordance with the present invention, the cable comprising a conductive central core 10, a layer 11 of semiconductive substance, an insulative envelope 12 preferably made from a polymer material, an equipotential screen 14 that has been terminated at a given distance from the free end of the cable so as to bare the insulative envelope 12 over a predetermined length according to the working voltage and the operating mode envisaged, and an outer sheath 16 which may comprise, for example, a metal shield coated with an insulative layer.

In order to produce a uniform distribution of the electric field along the length of the insulative envelope 12 and consequently to eliminate any risk of discharges occurring, there is provided around part of said envelope 12 running from the termination of the equipotential screen a multilayer structure 18 comprising one or more layers 18' of high permittivity insulative material and a layer 18" of a semiconductor material with a non-linear coefficient of conduction, the whole possibly being covered with an insulative sheath. For more details concerning this technique reference should be had to French patent No. 2 518 837 the contents of which are hereby incorporated herein by way of reference.

FIG. 1 is somewhat schematic and the transition between the combination comprising the equipotential screen 14 and the protective sheath 16 surrounding it, one the one hand, and the high permittivity structure 18, on the other hand, has not been shown in detail. Once again, reference should be had to the patent mentioned hereinabove.

In accordance with the invention, the cable termination is surrounded over all of the bared length of the insulative layer 12 and beyond the end of the conductive core 10 with an armoring comprising stiffener or reinforcing rods 20 regularly distributed around its periphery. These rods 20 will preferably be made from a composite insulative material, in particular epoxy resin reinforced with unidirectional (longitudinal) glass fibers. Also, a filler mastic 22 or some other dry deformable filler material will intimately fill all the spaces and interstices delimited by the rods 20, the high permittivity material 18 and outer tube 24 (see below) as shown in FIG. 2. This prevents the presence of air pockets in contact with the high permittivity multilayer structure 18.

The termination in accordance with the invention further comprises a protection and support outer tube or sleeve 24 which closely surrounds the rods 20 and the filler 22 and is closed at its ends by two insulative plates. The upper plate 26 comprises a central hole 28 in which is trapped axially a temminal 30 electrically connected to the conductive core 10. More precisely, the terminal 30 comprises a lower sleeve 30a fitted over the core 10 and connected to it mechanically and electrically, an intermediate part 30b of reduced cross-section through which it is axially immobilized and an upper part 30c projecting above the plate 26, for making the connection to the cable termination. An insulative sleeve 32 covers the end of the envelope 12 and the lower part of the terminal 30.

There is also a lower plate 34 through the center of which the cable passes and which is connected mechanically to the insulative outer sheath 16 of the cable, by clamping or adhesive bonding, for example.

The plates 26 and 34 are made from epoxy resin, for example.

The stiffener rods 20 are thus trapped in the tube 24 between the end plates 26 and 34 and, in conjunction with said plates, confer great rigidity on the cable termination and also resistance to compression, tension and bending forces.

Finally, the termination in accordance with the present invention comprises a set of external skirts 40, of which there are three in the example show, fixed to the outside periphery of the protective sleeve 24.

The sleeve 24 and the skirts 40 will be made from a flexible water-repellant material, preferably a silicone or ethylene-propylene rubber or in the form of a charged heat-shrinkable sheath, of cross-linked polyethylene charged with aluminum hydroxide, for example.

The high-voltage cable termination as described hereinabove has the following advantages.

Firstly, it makes it possible to dispense with the insulative oil which, in the prior art technique, is liable to leak and raises certain problems of a mechanical nature because of its high coefficient of expansion.

Also, the envelope of porcelain, a heavy, bulky, fragile and costly material that is difficult to use, has been eliminated.

Terminations in accordance with the invention are light in weight and easy to handle and may be mounted without difficulty in any appropriate spatial position. Also, the relative flexibility of the composite material used for the rods 20 as compared with porcelain gives greater freedom during mechanical assembly in the field.

From the electrical point of view the performance that can be achieved with the termination described hereinabove is of the same order of magnitude as that obtained with conventional terminations using a porcelain support envelope.

Moreover, the termination can in practice be made in various ways. For preference, however, the rods 20, the protective tube 24 and the combination of layers of high permittivity material will be in the form of hot or cold shrinkable separate elements or in the form of molded blocks.

The presence of the end plates 26 and 34 associated with the protective tube 24 makes it possible to obtain a seal where these elements fit together. In this way the composite material from which the reinforcing rods are made will be permanently protected from moisture, to the benefit of its durability.

Finally, the availability of the insulative surface of the end plate 34 for supporting the cable termination decribed makes it possible in practise to dispesne with the use of additional insulative supports as are usually needed for fitting terminations with separate gorunds (as consituted by the equipotential screens), this technique usually being referred to as "x-bonding". In this connection, FIG. 1 shows in dashed outline members 42 supporting the termination through the intermediary of the plate 34.

Variations and modifications to the invention as described hereinabove are possible without departing from its scope.

Thus for certain classes of voltage (150 kV, or above) it will be possible to provide a cylindrical guard electrode 44 directed upwards as shown in FIG. 1, enhancing action of the high permittivity layers by tending to orient the equipotential lines radially.

What is more, the semiconductive layer with the non-linear coefficient of conduction could be omitted for high voltages.

More generally, any structure for distributing the electric field tending to attenuate the risk of discharge could be incorporated into the termination, between the cable and its reinforcing and protection arrangements.

Finally, the plates 26 and 34 and the terminal can be any shape and size and therefore well suited to adaptation to standardized connection methods.

I claim:

1. High-voltage electric cable termination comprising a cable having a conductive central core terminating in a bared end, a semiconductive substance covering said core, an insulative envelope, and an equipotential screen and a protective outer sheath that are terminated at a distance from the end of the cable to bare a predetermined length of said insulative envelope, at least one layer of high permittivity material extending over at least part of the length of said bared insulative envelope, an outer protective tube of insulative material extending over substantially all of the length of the termination, a set of stiffener rods of an insulative composite material inside and tube and extending parallel to the axis of the termination and a filler material intimately filling the space between said rods and between said at least one high permittivity material layer and said tube.

2. Termination according to claim 1, wherein said stiffener rods are made from glassfiber-reinforced epoxy resin.

3. Termination according to claim 1, further comprising insulative plates closing off respective ends of said protective tube.

4. Termination according to claim 3, further comprising a terminal connected electrically and mechanically to the bared end of said core and fastened axially to the insulative plate at the corresponding end of said tube.

5. Termination according to claim 4, wherein the insulative plate at the opposite end of said tube has a guard electrode fastened thereto.

6. Termination according to claim 3, wherein at least one of said insulative plates is of a size to provide mechanical support for the termination.

7. Termination according to claim 1, further comprising a seminconductor layer having a non-linear coefficient of conduction covering said high permittivity material layer.

8. Termination according to claim 1, wherein said filler material comprises a dry deformable material.

9. Termination according to claim 8, wherein said dry deformable material is a mastic.

10. Termination according to claim 1, further comprising a set of insulative skirts attached to the outside of said protective tube.

11. Termination according to claim 10, wherein said skirts and said protective tube are made from a water-repellant material selected from the group consisting of silicone rubber, ethylene-propylene rubber and charged heat-shrinkable materials.

* * * * *